(12) United States Patent
Matsuki

(10) Patent No.: US 7,561,211 B2
(45) Date of Patent: Jul. 14, 2009

(54) VIDEO/AUDIO SYSTEM

(75) Inventor: Hirotoshi Matsuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 473 days.

(21) Appl. No.: 10/576,202

(22) PCT Filed: Jun. 24, 2005

(86) PCT No.: PCT/JP2005/011620

§ 371 (c)(1),
(2), (4) Date: Apr. 17, 2006

(87) PCT Pub. No.: WO2006/030572

PCT Pub. Date: Mar. 23, 2006

(65) Prior Publication Data

US 2008/0122989 A1    May 29, 2008

(30) Foreign Application Priority Data

Sep. 14, 2004    (JP)    ............................. 2004-267427

(51) Int. Cl.
H04N 5/268    (2006.01)
(52) U.S. Cl. ........................ 348/705; 725/75
(58) Field of Classification Search ................ 348/705, 348/706, 554, 555, 556, 558; 725/74–76
See application file for complete search history.

(56) References Cited

U.S. PATENT DOCUMENTS

| 4,581,644 | A | * | 4/1986 | Deiss | ........................ 348/705 |
| 4,581,645 | A | * | 4/1986 | Beyers, Jr. | .................. 348/705 |
| 5,416,535 | A | * | 5/1995 | Sato et al. | .................... 348/706 |
| 2004/0125694 | A1 | | 7/2004 | Yamasaki et al. | |

FOREIGN PATENT DOCUMENTS

| JP | 60-084022 A | 5/1985 |
| JP | 7-15347 A | 6/1995 |
| JP | 10-93878 A | 4/1998 |
| JP | 2004-039037 A | 2/2004 |
| JP | 2004-118939 A | 4/2004 |

* cited by examiner

*Primary Examiner*—M. Lee
(74) *Attorney, Agent, or Firm*—Birch, Stewart, Kolasch & Birch, LLP

(57) ABSTRACT

A video/audio system includes a video/audio output unit (head unit) 1 for outputting video information and audio information to a monitor 5 or an audio transmitter 6; a video/audio output unit (external player) 2 which is connected to the video/audio output unit 1 via a common signal line 3 and carries out switching output of external video information and audio information to the monitor 5 or audio transmitter 6; and a remote control unit 4 for selectively operating the video/audio output units 1 and 2 externally. The video/audio output units 1 and 2 operate in at least one of the single and combined circuit modes in response to the signal transmitted through the common signal line 3.

9 Claims, 6 Drawing Sheets

VIDEO/AUDIO SYSTEM

TECHNICAL FIELD

The present invention relates to a video/audio system with a video or audio output function, and particularly to a video/audio system preferably used in a vehicle and the like.

BACKGROUND ART

In a conventional video/audio system in a vehicle, which includes a plurality of interconnected video/audio units with a video or audio output function, and which enables users to listen to a plurality of sources simultaneously via a plurality of audio output circuits, the plurality of users (for example, they are divided into front seat users and back seat users simply called front seats and back seats from now on) can select sources that they want to hear using control sections placed at the individual seats. In this case, it is a master unit that manages which of the sources selected by the plurality of users should pass through which audio output circuits. In other words, the system is constructed on the assumption that the master unit is always connected (see Relevant Reference 1, for example).

Relevant Reference 1: Japanese patent application laid-open No. 10-93878/1998

The conventional video/audio units with the video/audio output function have the foregoing configuration. Thus, without the master unit (a head unit, for example), the other connected units cannot operate. Accordingly, the system without any supposed master unit has a problem of being unable to connect other audio/video units.

Besides, a system having a plurality of interconnected singly operable video/audio units sometimes use similar accessories such as control sections and display units. In this case, as the number of the connected units increases, the number of the accessories also increases. In addition, since the video/audio units having the singly operable video/audio output function are configured as described above, they have a problem of increasing the number of needless accessories every time the video/audio unit is connected.

The present invention is implemented to solve the foregoing problems. Therefore it is an object of the present invention to provide a simple configuration, low cost video/audio system capable of combining a minimum number of components necessary for the system when a plurality of video/audio output units with the video and audio output functions are connected to operate as a system.

DISCLOSURE OF THE INVENTION

The video/audio system in accordance with the present invention includes a video/audio output unit (head unit) for outputting video information and audio information to a monitor or to an audio transmitter; a video/audio output unit (external player) which is connected to the video/audio output unit via a common signal line and carries out switching output of external video information and audio information to the monitor or audio transmitter; and a remote control unit for selectively operating the video/audio output units externally. The video/audio output units operate in at least one of the single and combined circuit modes in response to the signal transmitted through the common signal line.

The present invention can combine accessories such as the monitor and audio transmitter used for the video/audio system in a minimum necessary number for the system, thereby being able to carry out the simplification and cost reduction of the configuration.

BEST MODE FOR CARRYING OUT THE INVENTION

The best mode for carrying out the invention will now be described with reference to the accompanying drawings to explain the present invention in more detail.

Embodiment 1

Figure 1:
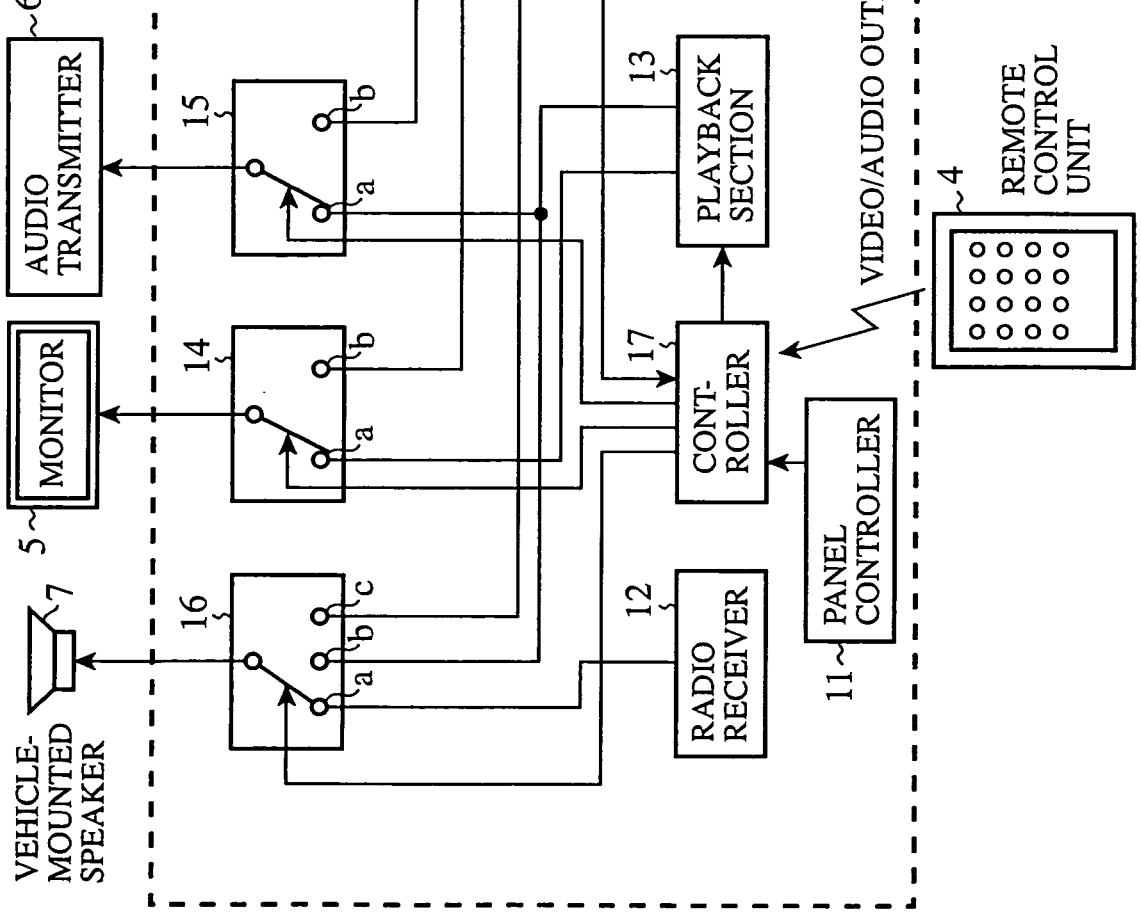
FIG. 1 is a block diagram showing a configuration of a video/audio system of an embodiment 1 in accordance with the present invention.

FIG. 1 is a block diagram showing a configuration of a video/audio system of an embodiment 1 in accordance with the present invention.

In FIG. 1, the video/audio system of the present embodiment includes: a video/audio output unit (called "head unit" from now on) 1 as a first information output means for outputting a video signal and/or audio signal as first video information and audio information; a video/audio output unit (called "external player" from now on) 2 as a second information output means for outputting a video signal and/or audio signal as second video information and audio information; a common signal line 3 such as a vehicle-mounted bus for transmitting between the head unit 1 and the external player 2 a signal that enables the head unit 1 and external player 2 to decide the current operating state of each other; a remote control unit 4 as a remote control means having buttons for a back seat user to select a source which the user wants to enjoy and the head unit 1 or external player 2 can recognize; a monitor 5 to which the video signal from the head unit 1 or the video signal from the external player 2 can be input; an audio transmitter 6 to which the audio signal from the head unit 1 or the audio signal from the external player 2 can be input; and a vehicle-mounted speaker 7 for converting the audio signal from the head unit 1 to sounds. The monitor 5, audio transmitter 6 and vehicle-mounted speaker 7 constitute a display means substantially.

The head unit 1 includes: a panel controller 11 disposed on the head unit 1; a radio receiver 12 for receiving a radiobroadcast; a playback section 13 having a DVD mechanism of the head unit 1 and serving as a first information playback means of video/audio media; a video output section 14 which receives video signals from the playback section 13 and external player 2, and has a switching function (video output changeover switch) as to which of the video signals is to be fed to the monitor 5; an audio output section 15 which receives audio signals from the playback section 13 and external player 2, and has a switching function (transmitter output changeover switch) as to which of the audio signals is to be fed to the audio transmitter 6; an audio output section 16 which receives audio signals from the radio receiver 12, playback section 13 and external player 2, and has a switching function (speaker output changeover switch) as to which of the audio signals is to be fed to the vehicle-mounted speaker 7; and a controller 17 as a first control means which is composed of a microcomputer, for example, for controlling the radio receiver 12, playback section 13 and external player 2 in response to the signal on the common signal line 3 or to the operation of the remote control unit 4 or panel controller 11, and for controlling the video output section 14, audio output section 15 and audio output section 16.

The external player 2 includes a playback section 21 as a second information playback means of the video/audio medium which has an external DVD mechanism; a controller 22 as a second control means for controlling the playback section 21 in response to the signal on the common signal line 3 and the operation of the remote control unit 4, and for controlling the operation of the switch which will be described below; and a changeover switch 23 as a switching means having switches 23-1, 23-2 and 23-3 which are provided between the playback section 21 and the video output section 14, audio output section 15 and audio output section 16 of the head unit 1, and are switched in response to the switching control signal from the controller 22. In addition, at the top of the external player 2, terminals T1, T2 and T3 are provided for connecting the monitor 5, audio transmitter 6 and vehicle-mounted speaker 7 to the playback section 21 via the changeover switch 23 when using the external player 2 singly.

A contact a of the video output changeover switch of the video output section 14 is connected to the output side of the playback section 13, and a contact b is connected to the output side of the playback section 21 via the switch 23-1 of the changeover switch 23 of the external player 2. The contacts a and b are switched in response to the switching control signal from the controller 17. A contact a of the transmitter output changeover switch of the audio output section 15 is connected to the output side of the playback section 13, and its contact b is connected to the output side of the playback section 21 via the switch 23-2 of the changeover switch 23 of the external player 2. The contacts a and b are switched in response to the switching control signal from the controller 17. A contact a of the speaker output changeover switch of the audio output section 16 is connected to the output side of the radio receiver 12, and its contacts b and c are connected to the output side of the playback section 13 and the output side of the playback section 21 via the switch 23-3 of the changeover switch 23 of the external player 2. The contacts a, b and c are switched in response to the switching control signal from the controller 17.

A contact a of the switch 23-1 of the changeover switch 23 is connected to the terminal T1, and its contact b is connected to a contact b of the video output changeover switch of the video output section 14. Likewise, a contact a of the switch 23-2 of the changeover switch 23 is connected to the terminal T2, and its contact b is connected to the contact b of the transmitter output changeover switch of the audio output section 15. In addition, a contact a of the switch 23-3 of the changeover switch 23 is connected to the terminal T3, and its contact b is connected to the contact c of the speaker output changeover switch of the audio output section 16. The contacts a and b of the switches 23-1-23-3 of the changeover switch 23 are switched in response to the switching control signal from the controller 22.

Figure 2:
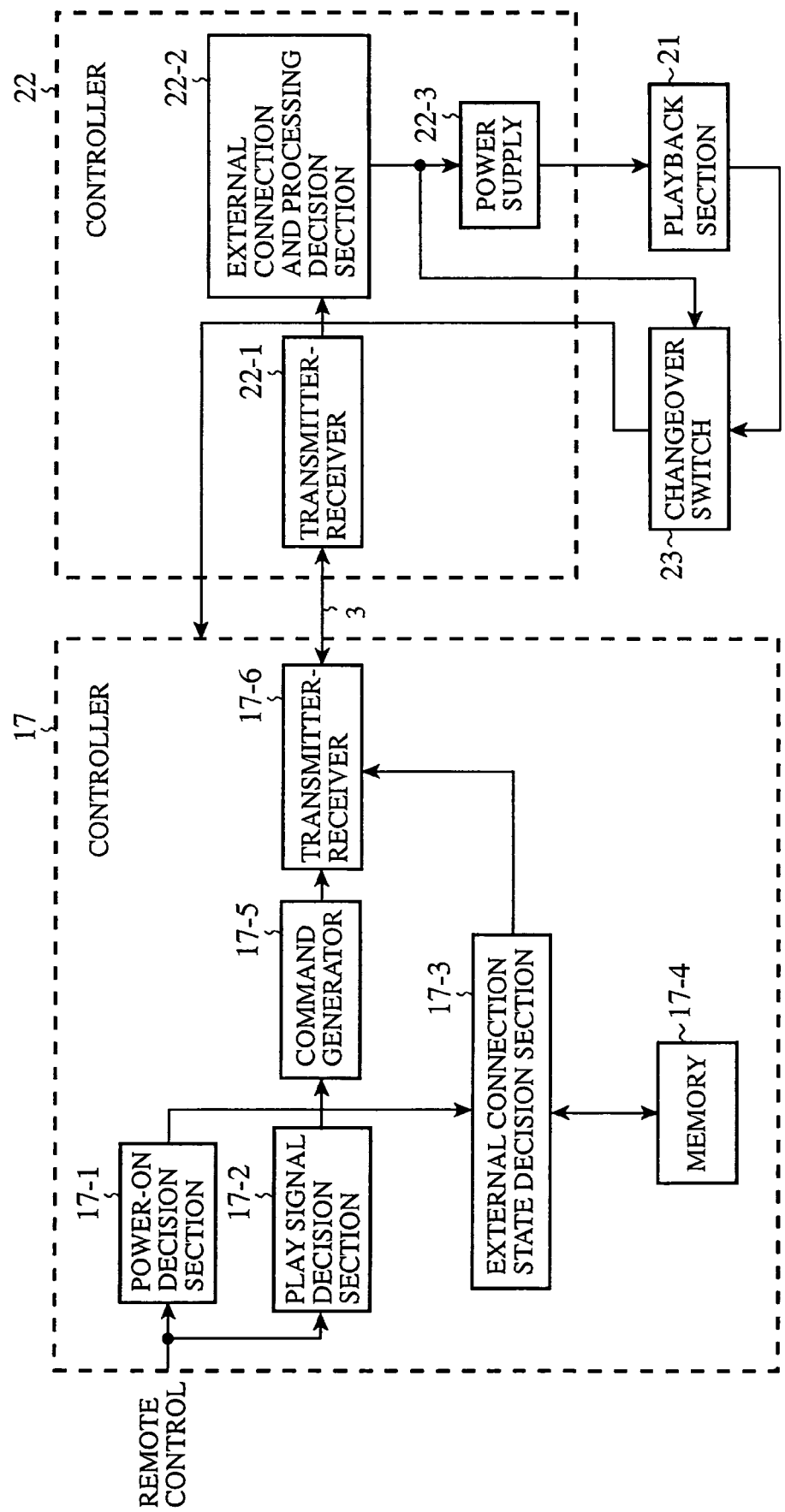
FIG. 2 is a diagram showing a concrete configuration of a main portion of the video/audio system of the embodiment 1 in accordance with the present invention.

FIG. 2 is a block diagram showing a concrete configuration of the controller 17 of the head unit 1 and the controller 22 of the external player 2.

In FIG. 2, the controller 17 of the head unit 1 includes: a power-on decision section 17-1 for making a decision as to whether the user depresses a power button of the external remote control unit 4; a play signal decision section 17-2 for making a decision as to whether the user depresses a play button such as a MODE button of the external remote control unit 4; an external connection state decision section 17-3 as an external connection state decision means for recognizing an external connection state by making a decision as to the connection state and the like of the external player 2 by comparing the output of the power-on decision section 17-1 with external connection information and the like stored in a memory 17-4 in advance; a command generator 17-5 for generating a corresponding command in response to the decision results fed from the play signal decision section 17-2; and a transmitter-receiver 17-6 for transmitting to the external player 2 side the command generated by the command generator 17-5 in response to the decision results of the external connection state decision section 17-3, and for receiving from the external player 2 side, that is, for transmitting and receiving between the head unit 1 and external player 2 the signal that enables the head unit 1 and external player 2 to decide the states of each other via the common signal line 3.

The controller 22 of the external player 2 includes: a transmitter-receiver 22-1 that has the same function as the transmitter-receiver 17-6 of the head unit 1, and transmits and receives the signals on the common signal line 3; and an external connection and processing decision section 22-2 serving as an external connection decision/processing means for recognizing the external connection state by making a decision as to the connection state and the like of the external player 2 from the signal on the common signal line 3 which is the output of the transmitter-receiver 22-1, for controlling turning on and off of a power supply 22-3 of the playback section 21 by making a decision as to the manner of the processing corresponding the external connection state, and for controlling the operation of the switch 23. Incidentally, a configuration is also possible in which the controller 22 of the external player 2 receives the operation from the external remote control unit.

Next, the operation will be described with reference to FIGS. 3-6.

Figure 3:
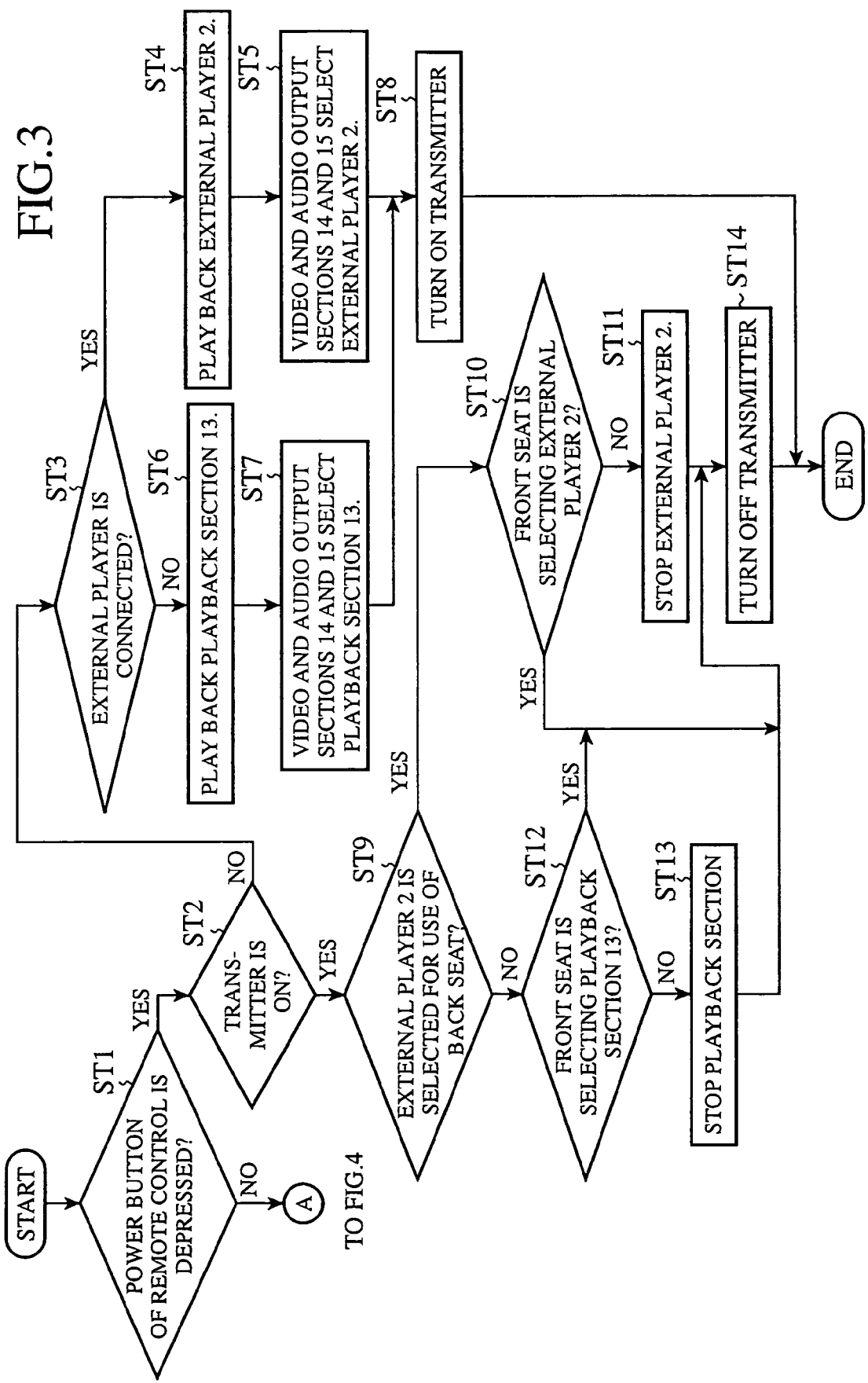
FIG. 3 is a flowchart illustrating the operation of the embodiment 1 in accordance with the present invention.
Figure 4:
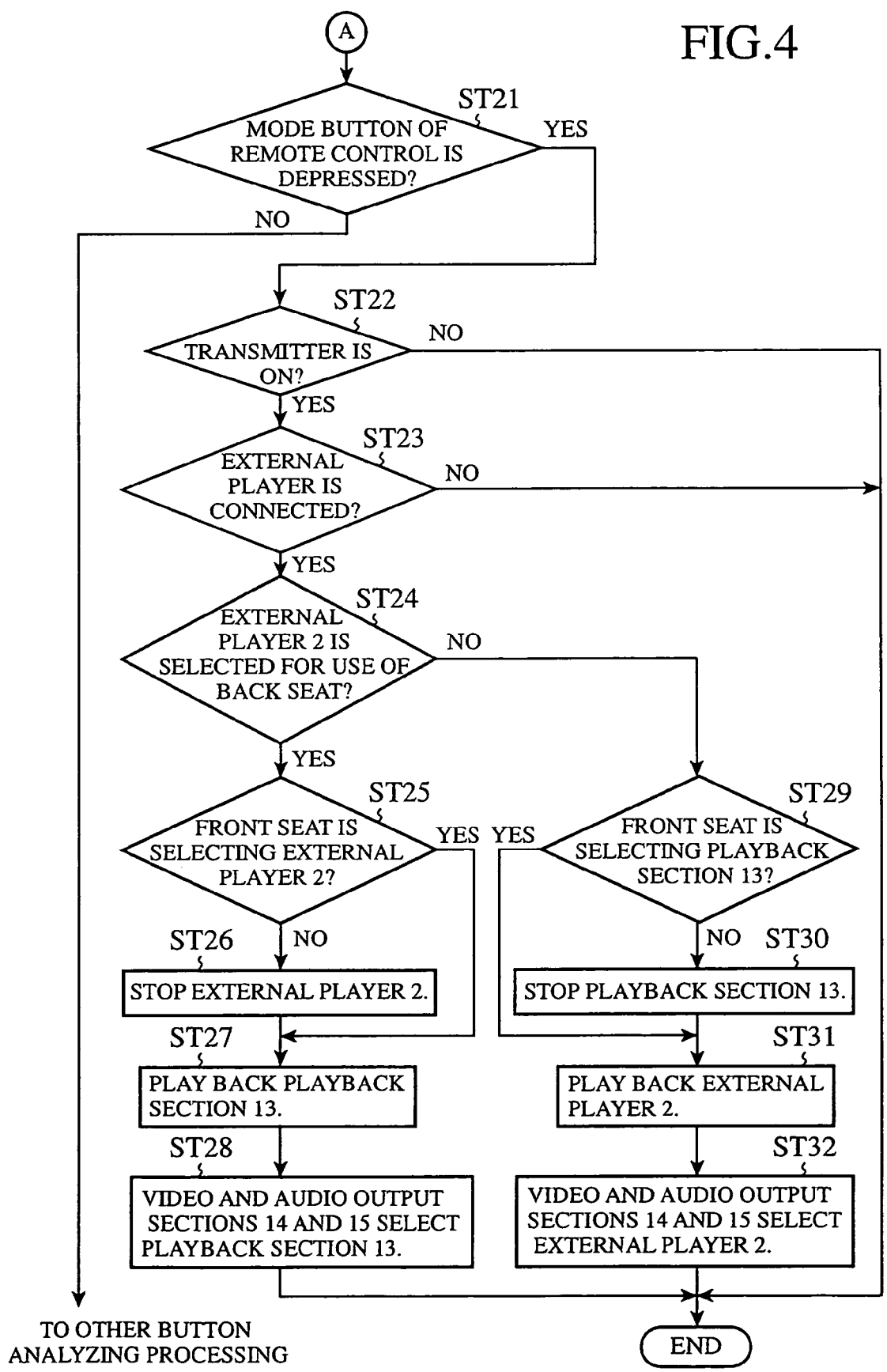
FIG. 4 is a flowchart illustrating the operation of the embodiment 1 in accordance with the present invention.

First, referring to FIGS. 3 and 4, the operation of the head unit 1 will be described.

The power button of the external remote control unit 4, which is used to turn on and off the audio transmitter 6, is assumed to be used by the back seat user (it is assumed that the back seat user can listen to sources identical to or different from those of the front seats with a headphone (not shown) via the audio transmitter 6). The controller 17 makes a decision as to whether the power button of the remote control unit 4 is depressed or not (step ST1), and starts the power button analyzing processing of the remote control unit 4 if the button is depressed. First, the power-on decision section 17-1 of the controller 17 makes a decision as to whether the audio transmitter 6 is currently in the ON state or not (step ST2). If the audio transmitter 6 is in the OFF state, the controller 17 has the external connection state decision section 17-3 make a decision as to whether the external player 2 is connected or not using the signal on the common signal line 3 between the head unit 1 and external player 2 (step ST3).

When the external player 2 is connected, the controller 17 plays back the external player 2 using the signal on the common signal line 3 (step ST4), and turns the switches 23-1 and 23-2 to the contact b side so that both the video output section 14 and audio output section 15 select the external player 2 (step ST5). After that, the head unit 1 ignores all the buttons of the remote control unit 4 except for the power button and MODE button. In contrast, the external player 2 makes a response to all the buttons except for the power button and MODE button when receiving the signal from the remote control unit 4.

On the other hand, when the external player 2 is not connected at step ST3, the controller 17 plays back the playback section 13 of the head unit 1 (step ST6), and has the video output section 14 and audio output section 15 both select the playback section 13 by turning the switches to the contact a side (step ST7). Subsequently, the audio transmitter 6 is turned on (step ST8)

When the audio transmitter 6 is in the ON state at step ST2, the controller 17 makes a decision as to whether the source available for the use of the back seat is the external player 2 or not, that is, whether it is the playback section 13 or external player 2 (step ST9). If it is the external player 2, the controller 17 makes a decision as to whether the front seat selects the external player 2 or not (step ST10). Unless the front seat selects the external player 2, the controller 17 halts the external player 2 using the signal on the common signal line 3 (step ST11).

When the source available for the use of the back seat is the playback section 13 at step ST9, the controller 17 makes a decision as to whether the front seat selects the playback section 13 or not (step ST12). Unless the front seat selects the playback section 13, the controller 17 halts the playback section 13 (step ST13), followed by turning off the audio transmitter 6 (step ST14).

When the front seat selects the external player 2 at step ST10 or the play back section 13 at step ST12, the audio transmitter 6 is turned off at step ST14.

Subsequently, unless the power button of the remote control unit 4 is depressed at step ST1, the controller 17 makes a decision as to whether the MODE button of the remote control unit 4 is depressed or not at step ST21 of FIG. 4. When the MODE button of the remote control unit 4 is depressed, the MODE button analyzing processing of the remote control is started.

First, the controller 17 makes a decision as to whether the audio transmitter 6 is currently in the ON state or not (step ST22). When the audio transmitter 6 is in the ON state, the controller 17 has the external connection state decision section 17-3 make a decision as to whether the external player 2 is connected or not using the signal on the common signal line 3 (step ST23). When the external player 2 is connected, the controller 17 makes a decision as to whether the external player 2 is selected for the back seat (rear seat), that is, whether the source available for the use of the back seat is the playback section 13 or the external player 2 (step ST24).

When the source available for the use of the back seat is the external player 2 at step ST24, the controller 17 makes a decision as to whether the front seat selects the external player 2 or not (step ST25). Unless the external player 2 is selected, the controller 17 stops the external player 2 using the signal on the common signal line 3 (step ST26). Subsequently, the controller 17 plays back the playback section 13 (step ST27), and has the video output section 14 and audio output section 15 both select the playback section 13 (step ST28). When the front seat selects the external player 2 at step ST25, the controller 17 plays back the playback section 13 as in steps ST27 and ST28, and has the video output section 14 and audio output section 15 both select the playback section 13.

On the other hand, when the source available for the use of the back seat is the playback section 13 at step ST24, the controller 17 makes a decision as to whether the front seat selects the playback section 13 or not (step ST29). Unless the playback section 13 is selected, the controller 17 stops the playback section 13 (step ST30). Subsequently, the controller 17 plays back the external player 2 using the signal on the common signal line 3 (step ST31), and has the video output section 14 and audio output section 15 both select the external player 2 (step ST32). When the front seat selects the playback section 13 at step ST29, the controller 17 plays back the external player 2, and has the video output section 14 and audio output section 15 both select the external player 2 as in steps ST31 and ST32. In addition, the head unit 1 ignores all the buttons except for the power button and MODE button of the remote control unit 4. The external player 2 makes a response to the buttons except for the power button and MODE button when the input from the remote control unit 4 is present.

Figure 5:
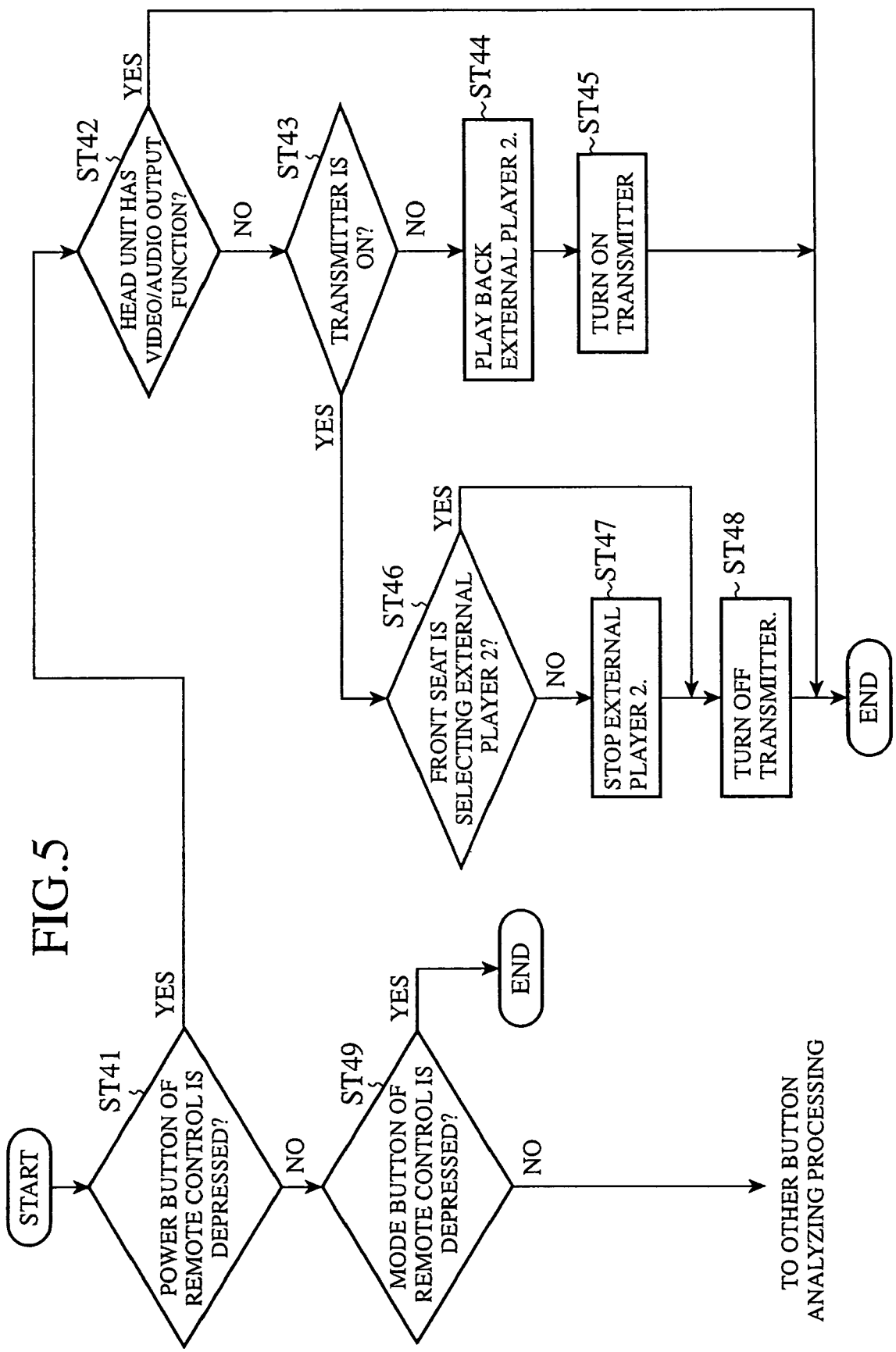
FIG. 5 is a flowchart illustrating the operation of the embodiment 1 in accordance with the present invention.

Next, the operation of the external player 2 will be described with reference to FIG. 5.

First, the controller 22 makes a decision as to whether the power button of the remote control unit 4 is depressed or not (step ST41), and starts the power button analyzing processing of the remote control if the power button is depressed. First, using the signal on the common signal line 3, the controller 22 makes a decision as to whether the head unit 1 has the video/audio output function. Specifically, the controller 22 has its external connection and processing decision section 22-2 make a decision as to whether the head unit 1 has the video output section 14 and audio output section 15 (step ST42), and does nothing when the head unit 1 has the video output and audio output functions. Thus, the ON/OFF control of the audio transmitter 6 is entrusted to the head unit 1.

Figure 6:
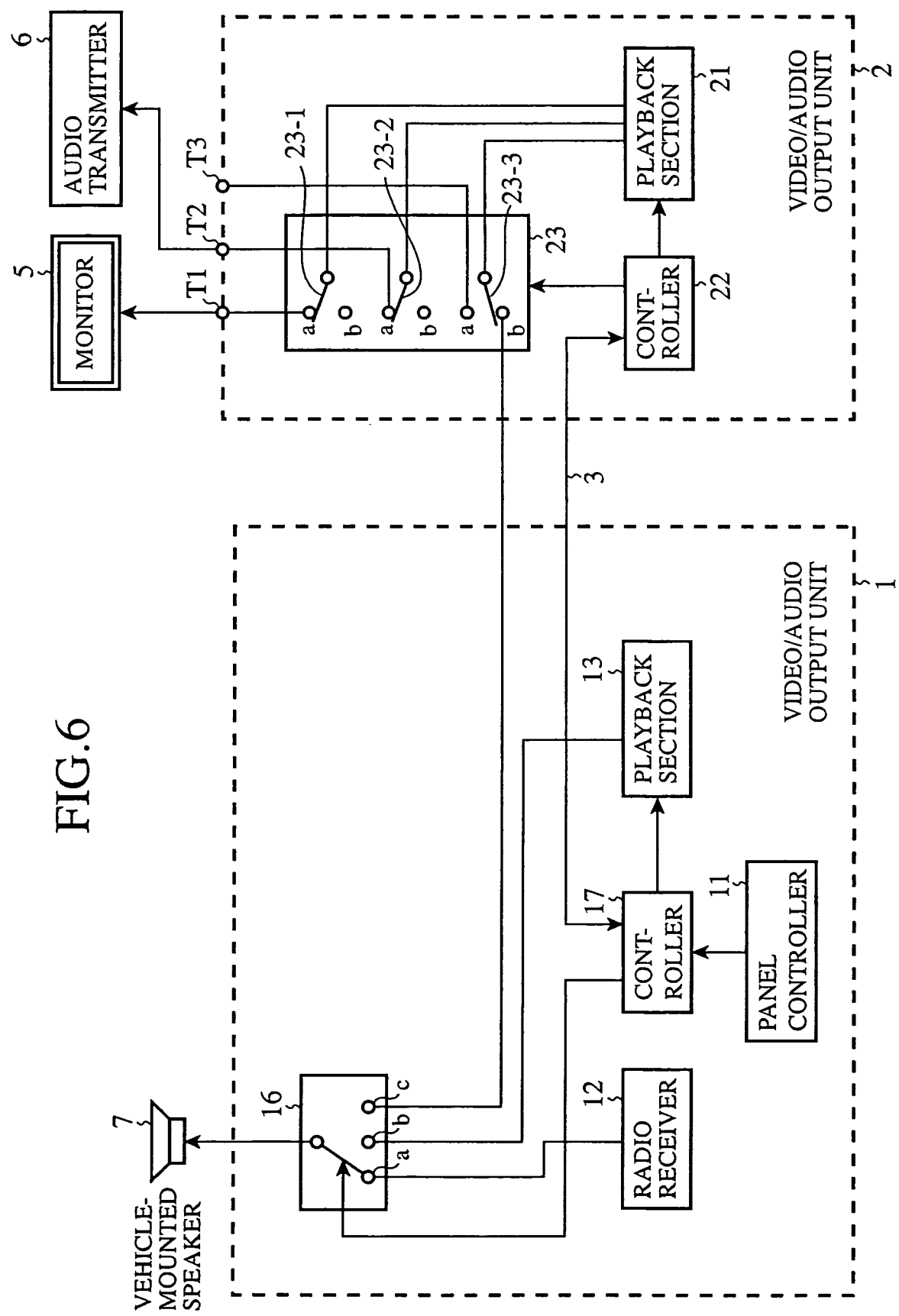
FIG. 6 is a block diagram showing a usage pattern of the video/audio system of the embodiment 1 in accordance with the present invention.

On the other hand, unless the head unit 1 has the video output and audio output function at step ST42, the controller 22 recognizes that the system is the combination of the configurations in which the head unit 1 does not have the video output section 14 or audio output section 15 as shown in FIG. 6, and makes a decision as to whether the audio transmitter 6 is in the ON state or not (step ST43). When the audio transmitter 6 is in the OFF state, the external player 2 is played back (step ST44), and the audio transmitter 6 used is turned on (step ST45). Thus, FIG. 6 shows an actual circuit configuration that uses the external player 2 singly in practice, although it has a circuit configuration combining the head unit 1 with the external player 2 in which the monitor 5 and audio transmitter 6 are connected to the terminals T1 and T2 of the external player 2 independently of the head unit 1.

When the audio transmitter 6 is in the ON state at step ST43, the controller 22 makes a decision as to whether the front seat selects the external player 2 or not (step ST46). Unless the external player 2 is selected, the external player 2 is stopped (step ST47), and the audio transmitter 6 is turned off (step ST48). When the front seat selects the external player 2 at step ST46, the audio transmitter 6 is also turned off at step ST48.

As described above, the present embodiment 1 is configured in such a manner that when a plurality of video/audio output units capable of outputting the video/audio are connected with each other, it constructs a consistent system by grasping the functions of the units using the signals between the video/audio output units, that is, the signals on the common signal line 3 between the head unit 1 and external player 2. As a result, the present embodiment 1 can combine accessories such as the remote control unit 4, monitor 5 and audio transmitter 6 for the back seat by a minimum necessary number for the system, thereby being able to carry out the simplification and cost reduction of the configuration.

In addition, even if the connection unit (for example, the master unit such as the head unit 1) is removed, the units can each recognize the removal using the signal on the common signal line 3. Thus the system can carry out automatic switching to enable single operation of the unit. In other words, the head unit 1 and the external player 2 can operate at least in one of the single and combined circuit configurations in response to the signals on the common signal line 3. Thus, not only the single or combined configuration of them, but also the configuration with partial modification in the combination such as removing part of the components is possible. As a result, the system can contribute to the simplification and cost reduction of the configuration, and a versatile system can be constructed.

Although the present invention is described above by way of example in which the video/audio system is mounted on a vehicle, this is not essential. For example, it is applicable to any objects that require such a video/audio system with offering the same advantages.

INDUSTRIAL APPLICABILITY

As described above, the video/audio system in accordance with the present invention is particularly suitable to offer good video/audio in a vehicle or the like.

What is claimed is:

1. A video/audio system comprising:
a head unit with a panel controller;
first information output means for outputting first video information and audio information from the head unit with a panel controller to display means;
second information output means connected to said first information output means via a common signal line, for carrying out switching output of second video information and audio information to said display means; and
remote control means for selectively operating said first and second information output means externally from the common signal line, with the remote control means carrying out an external decision state that allows an external connection decision/processing means to receive control means for selectively operating the video/audio system through the head unit with a panel controller wherein
said first and second information output means operate in one of single and combined circuit modes in response to a signal transmitted through the common signal line.

2. The video/audio system according to claim 1, wherein said first information output means comprises:
first control means for making a decision as to operation contents of the remote control means, and for generating a control signal in response to the decision result; and
first information playback means for selecting at least one of first video information and audio information in response to an output of said first control means, and
said second information output means comprises:
second control means for generating a control signal in response to a signal transmitted from said first information output means on the common signal line;
second information playback means for supplying said display means with the second video information and audio information in response to the control signal from said second control means; and
switching means for carrying out switching output of the second video information and audio information from said second information playback means to said display means in response to the control signal from said second control means.

3. The video/audio system according to claim 2, wherein
said first control means comprises external connection state decision means for recognizing an external connection state from at least the operation contents of said remote control means, and
said second control means comprises external connection decision/processing means for recognizing an external connection state and for carrying out corresponding processing in response to at least the signal output from said first control means via a common signal line.

4. The video/audio system according to claim 3, wherein said control means being provided by a controller that determines whether a power button on the remote control means has been depressed by a user.

5. The video/audio system according to claim 4, wherein after determining that the power button on the remote control means has been depressed and the controller being aware of the external decision state that allows an external connection decision/processing, the controller determines an audio transmitter power state.

6. The video/audio system according to claim 4, wherein after the controller determines an audio transmitter power state being active, the controller determines that an external player is connected, and a user has selected the external player for use in a seating position separate from a front seat position, the controller being aware of the external decision state that activates external control of the controller.

7. The video/audio system according to claim 6, wherein the controller will receive external decision state information along with the input from the panel controller located on the head unit.

8. The video/audio system according to claim 7, wherein the transmitter is active, and a user has selected the external player for use in a seating position located within the front seat, the controller being aware of the external decision state, deactivates the transmitter.

9. The video/audio system according to claim 7, wherein the transmitter is inactive, playback on a player separate from the head unit, activates the transmitter.

* * * * *